P. B. WHITNEY.
CENTRIFUGAL SPEED REGULATOR FOR DYNAMOS.
APPLICATION FILED JAN. 21, 1915.
1,190,496.
Patented July 11, 1916.
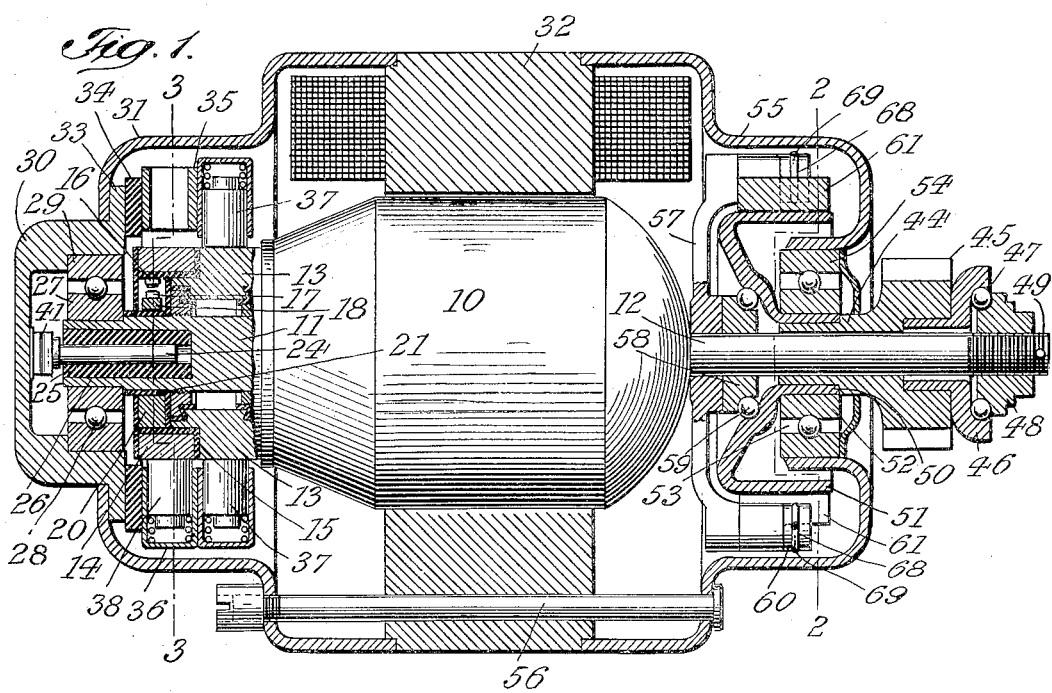
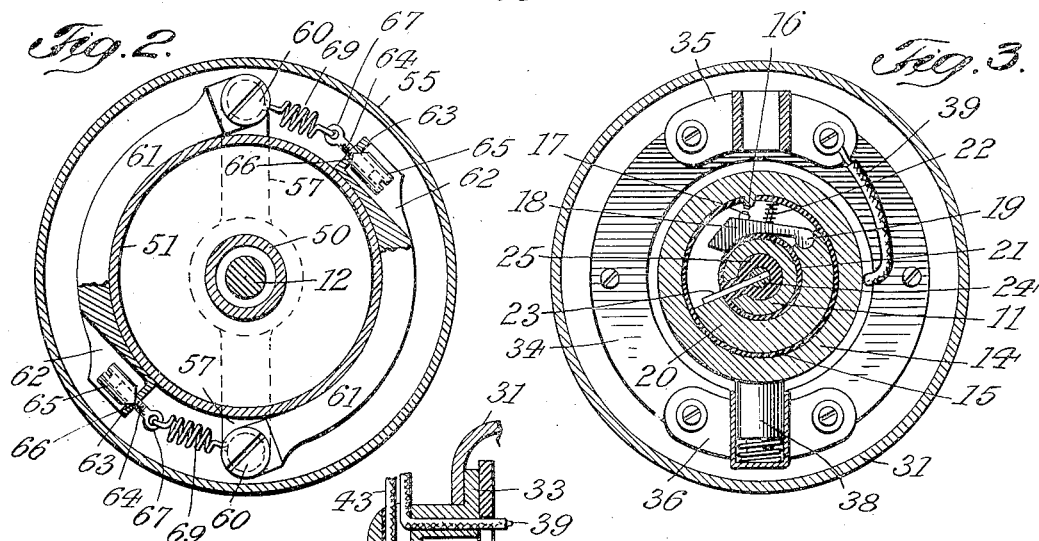
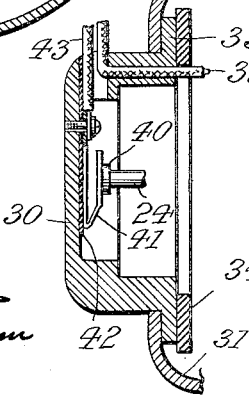
WITNESSES:
INVENTOR
Perrin B. Whitney
BY
ATTORNEYS.

UNITED STATES PATENT OFFICE.

PERRIN B. WHITNEY, OF NEW YORK, N. Y., ASSIGNOR TO MESINGER-WHITNEY ELECTRIC COMPANY, INC., OF NEW YORK, N. Y.

CENTRIFUGAL SPEED-REGULATOR FOR DYNAMOS.

1,190,496.  Specification of Letters Patent. Patented July 11, 1916.

Application filed January 21, 1915. Serial No. 3,520.

*To all whom it may concern:*

Be it known that I, PERRIN B. WHITNEY, a citizen of the United States, residing at New York city, county of Bronx, State of New York, have invented certain new and useful Improvements in Centrifugal Speed-Regulators for Dynamos, of which the following is a specification.

This invention relates to a novel centrifugal speed regulator for dynamos more especially designed for furnishing the necessary electric current for the operation of the horns and the lights of automobiles, motor cycles and similar vehicles, and also for charging the storage batteries that provide the lights with electric energy during a standstill of such vehicles. A dynamo of the above kind should fulfil three conditions, firstly, it should effectively prevent a return flow of the current from the charged storage battery to the dynamo which would result in a rapid destruction of the battery, secondly it should preclude the generation of current having unduly high voltage in case the vehicle is run at an excessively high rate of speed, and thirdly it should occupy as little space as possible to be readily mountable on the vehicles.

With all of these objects in view, the invention comprises more particularly novel means inclosed within the dynamo casing, for automatically interrupting the connection between the dynamo and storage battery whenever the speed of the dynamo falls below a certain limit so as to prevent the objectionable discharge of the battery current into the dynamo.

The invention includes further novel means also inclosed within the dynamo casing for preventing the speed of the armature from rising beyond a certain limit, to maintain the voltage of the generated current within predetermined lines thereby increasing the life of the horn and lights.

In the accompanying drawing: Figure 1 is a longitudinal section through a dynamo embodying my speed regulator; Fig. 2 a cross section on line 2—2, Fig. 1; Fig. 3 a cross section on line 3—3, Fig. 1; and Fig. 4 a cross section through the left end portion of Fig. 1, the section being taken at right angles to Fig. 3.

The armature 10 of the dynamo is supported by an axial shaft, the two protruding ends 11, 12 of which carry respectively the means for interrupting the current in case the armature-speed falls below a certain limit and the means for preventing the voltage from rising beyond a certain limit in case the armature-speed is unduly increased. The first named means include the usual insulated commutator segments 13 connected to the armature winding and carrying a continuous conductive ring 14 insulated therefrom as at 15, said ring extending axially beyond segments 13. From the protruding portion of ring 14, there extends inwardly through a corresponding opening of insulation 15, a contact 16 that is adapted to be engaged by the contact 17 of a lever 18. The latter is pivoted at 19 to a conductive ring-segment 20 firmly interposed between insulation 15 and an insulating ring 21 encircling shaft-end 11, a spring 22 tending to swing lever 18 inwardly. Segment 20 is, by an insulated pin or wire 23, connected to an axially extending stud 24 inserted into an insulating bushing 25 that is tightly fitted into a corresponding socket 26 of shaft-portion 11. The latter carries a relatively fixed ring 27 forming one member of a ball bearing 28 the other member 29 of which is firmly received by a cap 30 secured to a housing 31 that is attached to the field portion 32 of the dynamo. An inner flange 33 of cap 30 carries an insulating ring 34 that in turn supports a pair of diametrically opposed brush carriers 35, 36. Both of these carriers support spring-influenced brushes 37 engaging commutator 13 while carrier 36 is provided with an additional spring-influenced brush 38 engaging ring 14. Carrier 35, is, by wire 39, connected to the current-utilizing circuit (not shown), while the head 40 of stud 24 frictionally engages a contact spring 41 insulated from cap 30 as at 42 and connected to said circuit by a wire 43.

The end portion 12 of the armature-shaft is loosely embraced by the hub 44 of a driving pinion 45 that is in suitable manner connected to the power shaft of the motorcycle, automobile, etc. Pinion 45 carries at its outer free end the cup-shaped member 46 of a ball bearing 47, the other member 48 of which is screwed upon the threaded end 49 of shaft portion 12. To hub 44 is firmly attached the hub 50 of a clutch-drum 51 while hub 50 in turn carries the inner member 52 of a ball bearing 53. The outer member 54 of this bearing is secured to a housing 55, the latter and housing 31 being held against the field structure of the dynamo by screw bolts 56. To shaft portion 12 are firmly attached a spider 57 and a collar 58, between which and drum 51 a ball race 59 is interposed. Spider 57 comprises preferably two arms to the outer ends of which are pivoted at 60, curved jaws 61 that are adapted to closely hug drum 51. The free end of each jaw 61 is recessed as at 62 to form a cross web 63 through a perforation of which passes loosely a screw bolt 64. The latter carries a nut 65 having a wedge-shaped end that engages a corresponding nick 66 of web 63 thereby locking nut 65 in the position to which it has been set. Each bolt 64 is provided with an eye 67 between which and a circumferential recess 68 of the adjoining screw 60, a spring 69 is interposed.

It will be seen that upon a rotation of pinion 45, such motion will be transferred to armature 10 through drum 51, jaws 61, spider 57 and shaft-portion 12. As lever 18 participates in the rotation of armature 10, this lever will be swung outward owing to centrifugal action thereby closing contacts 16, 17. In this way, the current generated within the revolving armature 10 will flow from the armature-winding through commutator-segments 13, one of the brushes 37, say the brush of holder 35 through said holder 35 and wire 39 into the storage battery and light circuits, thence through wire 43, spring 41, stud 24, pin 23, segment 20, lever 18, closed contacts 17, 16, ring 14, brush 38, holder 36, brush 37 of holder 36 and segments 13 back to the armature-winding. It will thus be seen that as long as armature 10 is rotated with sufficient speed, contacts 17, 16 will remain closed thus insuring an uninterrupted supply of electric current. When the speed of armature 10 however falls below a certain limit, or while the car or motor cycle is at a standstill, spring 22 will cause an opening of contacts 17, 16 thus automatically preventing a return of current from the storage battery into the dynamo. If on the other hand the speed of pinion 45 is unduly increased, armature 10 is effectively prevented from participating in such high speed, because in this case the jaws 61 will be swung outward by centrifugal force, thereby loosening their previous tight grip on drum 51. In this way, the armature 10 and the jaws 61 will slow down until the latter will again tightly engage the drum 51, which play is continuously repeated as long as the speed of pinion 45 is above the normal. As the described loosening and tightening of the grip of jaws 61 on drum 51 alternates in rapid succession, the described connection between pinion 45 and armature 10 constitutes in fact a slip connection so that any detrimental effect of an excessively high speed of the car or motor cycle upon the battery, horn and lights is precluded.

It will be seen that by the construction described, all parts of the speed and circuit controlling devices are arranged in a compact manner and are safely housed together with the dynamo proper so as to prevent any accidental damage to these parts. During the attachment of the dynamo to the car or motor cycle, etc., the wiring is simplified and valuable space is saved.

I claim:—

1. A speed regulator for dynamos comprising an armature having a shaft, a hub embracing the shaft, a driving pinion on the hub, a ball bearing between hub and shaft, a clutch drum mounted on the hub, a housing encompassing the drum, a second ball bearing between drum and housing, a spider mounted on the shaft, a third ball bearing between the spider and drum and a plurality of spring-influenced jaws pivoted to the spider and adapted to engage the drum.

2. A speed regulator for dynamos comprising an armature having a shaft, a driving member loosely mounted thereon, a clutch drum fast on the driving member, a spider mounted on the shaft, jaws pivoted to said spider and adapted to engage the clutch drum, said jaws having apertured and nicked webs at their free ends, screw bolts passing loosely through said webs, wedge-shaped nuts mounted on the screw bolts and adapted to engage the web-nicks, and springs that connect the screw bolt of any one jaw with the pivot of the adjoining jaw.

PERRIN B. WHITNEY.

Witnesses:
August Ert,
C. Schillingen.